United States Patent [19]
Moore

[11] 3,930,643
[45] Jan. 6, 1976

[54] ROLL-OVER FIXTURE

[75] Inventor: Stanley H. Moore, Coquitlam, Canada

[73] Assignee: Wescan Mining Trucks & Equipment Ltd., Vancouver, Canada

[22] Filed: July 16, 1974

[21] Appl. No.: 488,949

[30] Foreign Application Priority Data
Apr. 24, 1974 Canada.................................. 198013

[52] U.S. Cl. .................... 269/58; 269/19; 269/71; 200/61.47; 214/1 Q
[51] Int. Cl.² ........................ B23Q 1/04; B25B 1/22
[58] Field of Search ....... 269/71, 19, 58; 200/61.52, 200/61.48, 61.47; 307/124, 118; 214/1 Q

[56] References Cited
UNITED STATES PATENTS

| 2,166,410 | 7/1939  | Jackson ........................... 200/61.47 |
| 2,224,958 | 12/1940 | Faber .................................... 269/71 |
| 3,155,219 | 11/1964 | Sterrett .............................. 214/1 Q |
| 3,190,463 | 6/1965  | Cohan ................................. 214/1 Q |
| 3,236,535 | 2/1966  | Barber ............................ 200/61.52 |
| 3,669,409 | 6/1972  | Eranosian ....................... 200/61.48 |
| 3,710,955 | 1/1973  | Redman .............................. 214/1 Q |

*Primary Examiner*—Al Lawrence Smith
*Assistant Examiner*—Robert C. Watson

[57] ABSTRACT

A workholder or roll-over fixture including a primary supporting structure and a pair of workholding elements mounted for rotation in the structure about a fixed axis of rotation and providing a work-receiving area therebetween. The workholder is particularly suitable for servicing and maintaining large and heavy machinery. The workholder includes a control system including a sensing means that is sensitive to out of balance forces within the workholder caused by rotation of the workpiece when held by the workholding elements and movement of the center of gravity of the workpiece relative to the axis of rotation. This control system also preferably includes a device mounted on one of the workholding elements which is adapted to sense the attitude thereof. The sensing means provides an output signal, which is sent through the attitude sensing device, indicative of the out of balance forces. Adjusting means are responsive to this output signal and effect positional adjustment of the workholding elements on the structure relative to the axis of rotation. This positional adjustment tends to decrease and remove the out of balance forces by moving the center of gravity closer to the axis of rotation. The preferred adjusting means include a hydraulic motor and lead screw mounted in and on each of the workholding elements.

20 Claims, 14 Drawing Figures

ROLL-OVER FIXTURE

This invention relates to a workholder or roll-over fixture including a support structure and workholding means mounted for rotation in this structure about a fixed axis of rotation, whereby a workpiece can be rotated as desired to permit necessary work to be carried out thereon. In particular the present invention is directed to workholders suitable for large, heavy workpieces such as electric motors and generators for heavy equipment.

BACKGROUND TO THE INVENTION

While carrying out servicing or maintenance operations on a workpiece or piece of equipment, it is often necessary or desirable to be able to rotate the workpiece to a variety of positions. Sometimes this is necessary to make the work area accessible to the operator or workman. In various kinds of welding in particular it is frequently desirable that the part being worked on be freely movable, often to permit the welder to control the gravity flow of welded metal and fused metal about a weld.

Support structures which permit a workpiece to be rotated are well known and are commonly referred to as roll-over fixtures. For example, one known fixture or workholder has a primary supporting structure and workholding means mounted for rotation in the supporting structure about a fixed axis of rotation. The workholding means consists of a pair of spaced-apart workholding elements providing a work-receiving area therebetween. An apparatus is generally provided for rotating the workholding means and thus the workpiece as desired. When the workpiece is initially mounted in the workholder, generally in an upright position, the workpiece can be arranged so that its centre of gravity is located along the plane formed by the centre lines of the two workholding elements, these centre lines extending in the vertical direction through the centre of the elements when they are in an upright position. Thus there is little or no turning torque due to the weight of the workpiece on the workholding elements initially.

With known workholders however, as soon as the workpiece is rotated from its initial position, a turning torque may be set up by the weight of the workpiece due to the centre of gravity of the workpiece not being located on the axis of rotation thereof. This turning torque will either make it more difficult to rotate the workpiece if the torque is in the opposite direction as the direction of rotation or it will make it easier to rotate the workpiece if the torque is in the same direction as the direction of rotation. Therefore the turning torque of the centre of gravity may require that a power source capable of providing a relatively large amount of power be used to turn the workpiece than would otherwise be the case if the centre of gravity was located on the axis of rotation. Alternatively the turning torque of the centre of gravity could give rise to a runaway condition that might damage either the workpiece or workholder or both. For example, if an engine is used to rotate the workpiece, this engine might be caused to overspeed because of the turning torque, damaging the engine possibly. The turning torque of the centre of gravity can also set up high stress levels in either the components of the workpiece or workholder as the workpiece is rotated.

The problems arising from the turning torque of the centre of gravity are generally not as severe with small workpieces obviously. With such workpieces it is sometimes possible to arrange the centre of gravity on the axis of rotation of the workholder effectively eliminating any undesirable turning torque. It is also easier to build the components of the workholder so that they can withstand any possible turning torque from the relatively small weight of the workpiece.

However severe "turning torque" problems can arise where the workpiece to be serviced or worked on is quite large in size and heavy. Examples of such workpieces would include massive electric wheel motors for large off-highway trucks, large transmissions and generators for such vehicles and locomotive engines. Large workholders or roll-over fixtures are often required to service and maintain such equipment. The weight of such equipment is in the order of five tons or more. It may be difficult to locate the centre of gravity of such machinery on the axis of rotation of the roll-over fixture and, when it is not so located, great turning torques can be set up in the fixture as soon as the workpiece in question is rotated to any significant extent. Clearly too, a motor of some sort is employed to rotate such workpieces.

It is an object of the present invention to provide a workholder which substantially overcomes the above-mentioned problem arising from the inherent turning torque of the weight of the workpiece placed in the workholder.

It is a further object of the invention to provide a workholder which overcomes this problem by means including a control system comprising sensing means sensitive to out of balance forces within the workholder caused by rotation of a workpiece and providing an output signal indicative of these forces, and adjusting means responsive to this signal to effect positional adjustment of the workholding means.

SUMMARY OF THE INVENTION

Accordingly, the workholder of the present invention comprises a workholder comprising a primary supporting structure; workholding means mounted for rotation in said structure about a fixed axis of rotation; a control system comprising sensing means sensitive to out of balance forces within said workholder, said forces being caused by the rotation of a workpiece when held by said workholding means and horizontal movement of the centre of gravity of said workpiece relative to said axis of rotation, said sensing means providing an output signal indicative of said forces, and adjusting means responsive to said output signal to effect positional adjustment of said workholding means on said structure relative to said axis of rotation, said positional adjustment tending to decrease and remove said out of balance forces.

Preferably the adjusting means includes an attitude sensing device which is mounted on the workholding means and is adapted to sense the attitude of the workholding means and to transmit the output signal accordingly to the remainder of the adjusting means.

Also in a preferred embodiment, the workholding means comprises a pair of spaced-apart workholding elements, each element having a first part mounted for rotation on a shaft journaled in the structure. A second part is attachable to the workpiece and is rotatable with and slidable in the first part. Sliding movement of the second part is controlled by the adjusting means responsive to the output signal.

A preferred embodiment of the workholder of the present invention will now be described in detail, by way of example, with reference to the accompanying drawings.

DETAILED DESCRIPTION OF PREFERRED EMBODIMENT

Figure 1:
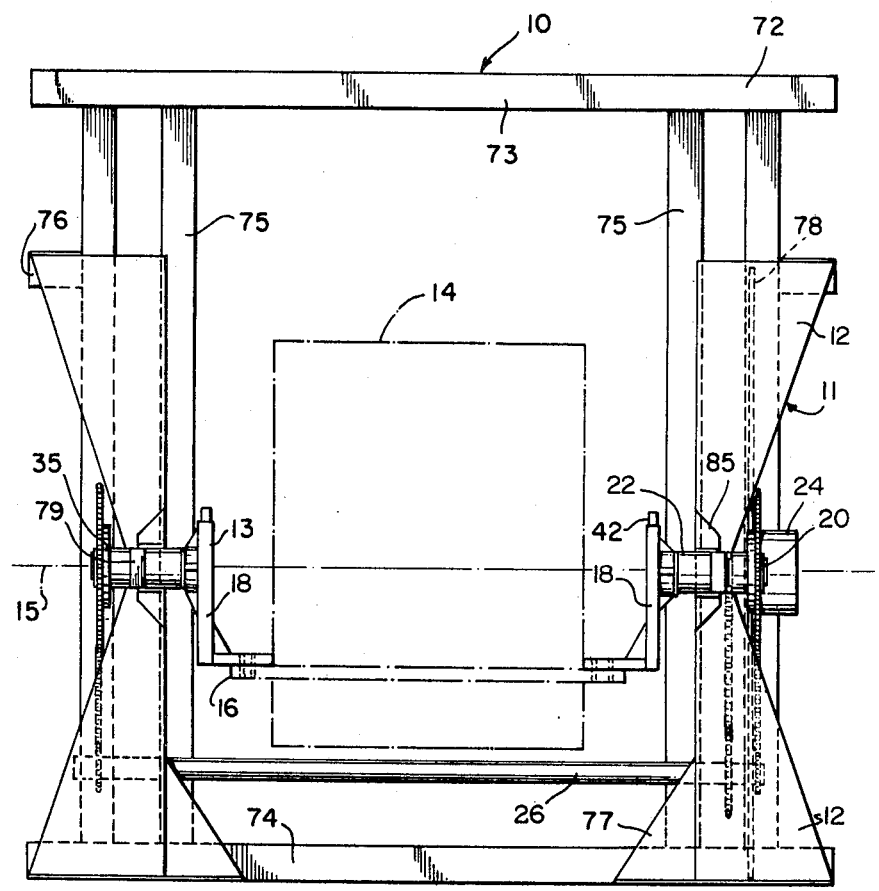
FIG. 1 shows in plan view the general arrangement of a roll-over fixture or workholder according to the invention, the workpiece shown in dotted outlines.
Figure 2:
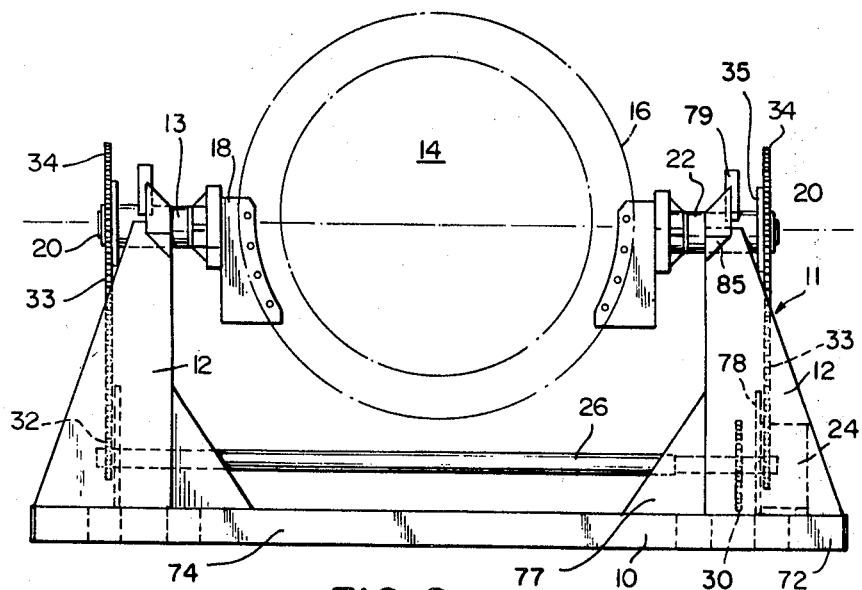
FIG. 2 is a front elevation of the workholder according to FIG. 1.
Figure 3:
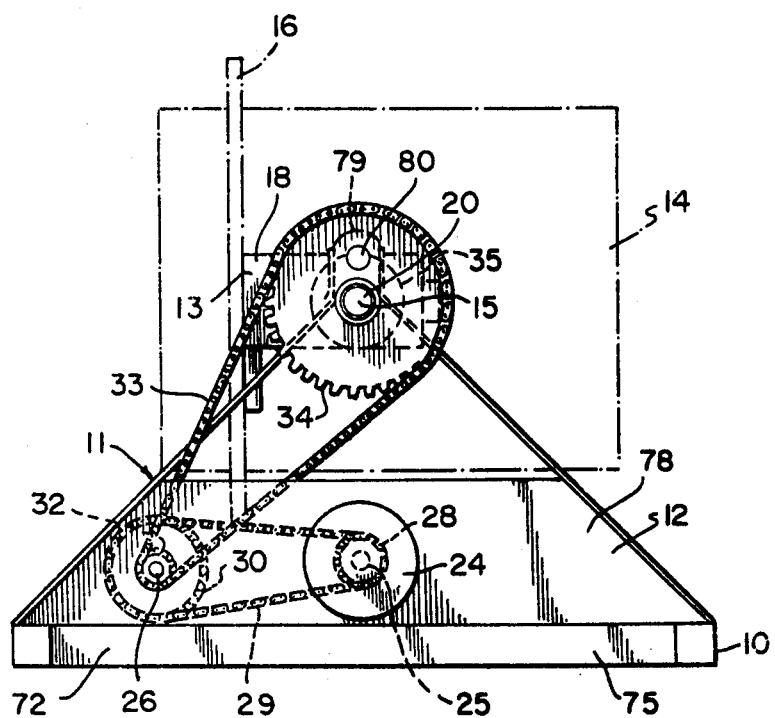
FIG. 3 is a side elevation of the workholder as shown in FIGS. 1 and 2.

As shown in FIGS. 1 to 3 of the drawings, the workholder or rollover fixture 11 of the present invention includes a primary supporting structure 10 and workholding means 13 mounted for rotation in the supporting structure 10 about a fixed axis of rotation 15. The workpiece 14, which is mounted in the workholding means 13, is shown in FIGS. 1 to 3 in dot-dash lines. The illustrated workpiece could comprise one of the aforementioned electrically driven wheels for a large off-highway type truck and could weigh in the order of 5 tons. This workpiece or wheel has a circular mounting flange or frame 16 by means of which the workpiece is connected to the workholding means 13. It will be seen from an examination of FIGS. 1 to 3 that this frame or flange surrounds the workpiece 14 at a position located away from the axis of rotation 15. The frame 16, which in this embodiment is formed integrally on the workpiece, is arranged in a vertical plane and is connected by bolts or other suitable connecting means on opposite sides to two workholding elements 18 of the workholding means 13.

Returning now to the primary supporting structure 10, the structure includes a generally rectangular base frame 72 having two, parallel end-frame members 73 and 74 and four longitudinally extending frame members 75. The frame members 75 are arranged in pairs on each side of the workholder and are connected at their ends to end frame members 73 and 74. The outermost frame member 75 of each pair is located a short distance in from the ends of frame members 73 and 74 while the innermost frame member 75 of each pair is located inwardly a short distance from the outermost frame member 75.

Each side of the supporting structure 10 is identical to the other side except that it is the mirror image of the other and except for the differences described hereinafter. Thus, each side of the supporting structure 10 has two sloping pivot frame members 12, each of which has a trapezoidal shape and is formed from a material such as rigid steel plate. The rearward pivot frame member 12 is rigidly connected at its relatively wide bottom end to each of the frame members 75 and is also rigidly connected to a short transversely extending frame member 76. The short frame member 76 is likewise rigidly connected at its inner end to the adjacent frame member 75. The forwardmost pivot frame member 12 is rigidly connected at its relatively wide bottom end to the front end frame member 74 at the top thereof. The forwardmost frame member 12 is provided with additional support in the form of a triangular support plate 77 which is rigidly connected along one side to the inner side of frame member 12 and which is rigidly connected along its bottom edge to the top surface of end frame member 74. The two pivot frame members 12 on each side is strengthened by the use of a trapezoidal-shaped, longitudinally extending, vertical support plate 78. The plate 78 is rigidly connected such as by welding to the top of the outermost frame member 75 and is rigidly connected along each end to the inner surface of the frame members 12. As can be seen from FIG. 3, the height of the support plate 78 is approximately one half that of the pivot frame members 12 which slope at approximately 45 degrees or somewhat less to the horizontal.

On each side of the supporting structure 10 where the upper ends of the two pivot frame members 12 meet is rigidly mounted a short, horizontally extending sleeve 22. The sleeve 22 is rigidly connected at each side to the relatively short upper ends of the pivot frame members 12. A turn-over shaft 20 is rotatably mounted in each of the sleeves 22 and extends from each end thereof. Suitable bearings such as roller bearings are arranged between each shaft 20 and its respective sleeve 22 to permit the shaft to rotate freely without undue wear. Preferably bearing assemblies are located at both ends of the sleeve 22 to provide suitable support at both the working end and at the sprocket end of the shaft.

Preferably, an eye connection 79 is formed on top of each sleeve 22 to provide means for fastening a hook or cable or chain to the workholder so that the workholder can be transported to any desired location in the plant or shop. The eye connection is formed with a concave bottom edge adapted to fix snuggly on top of the adjacent sleeve surface and this edge is rigidly connected to the sleeve such as by welding. A hole 80 for the hook is formed in the centre of the eye connection. The eye connection can be strengthened with the use of two angle-shaped brackets 85. Each bracket 85 is rigidly connected along a downwardly sloping bottom portion to one of the pivot frame members 12 and is rigidly connected to the eye connection by a vertical portion. Thus there is a direct connection between each pivot frame member 12 and the eye connection so as to avoid undue strain during any lifting of the workholder on the sleeves.

Figure 5:
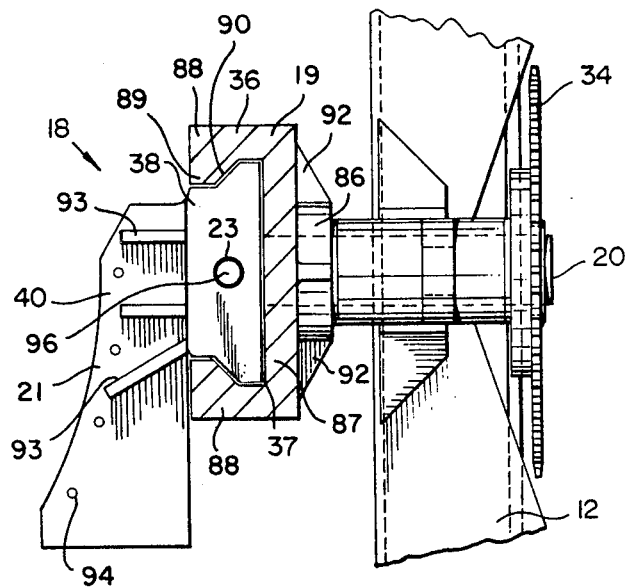
FIG. 5 is a plan view of the workholding element of FIG. 4, partly in section along line A—A of FIG. 4.
Figure 4:
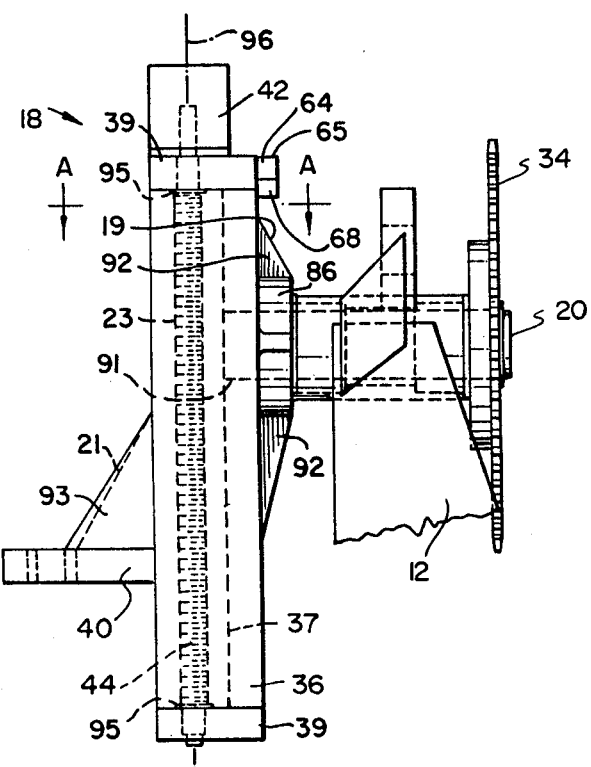
FIG. 4 shows a detailed side elevation of an adjustable workholding element and showing the manner in which it is connected to the support structure.

Rigidly connected to the inner end of each turn-over shaft 20 is the aformentioned workholding element 18. This element is shown in detail in FIGS. 4 and 5 of the drawings wherein can be seen a first part 19 of the workholding element which is mounted for rotation on the shaft 20 and a second part 21 attachable to the workpiece 14. The second part 21 is rotatable with the first part 19 and is slidable therein. This sliding movement of the second part within the first part is controlled by adjusting means 23 described in detail hereinafter. The first part 19 includes an elongated channel-shaped member 36, two end plates 39 mounted at the ends of the member 36, and a ring-shaped connecting member 86 which is rigidly connected to the upper part of the outer surface of the member 36. In FIGS. 4 and 5 of the drawings, the channel-shaped member 36 extends generally horizontally and forms a guideway 37 which extends the length of the member 36. The bottom and sides of the guideway 37 are defined by the base portion 87 and the two inwardly extending leg portions 88 of the member 36 (best shown in FIG. 5). Each leg portion 88 is formed with a lip 89 which is located at the end of the leg portion furthest from the base portion and which extends in the direction of the lip 89 of the other leg portion. Each lip 89 forms a sloping shoulder 90 facing generally inwardly towards the shaft 20 and also towards the base portion 87. Each end plate 39 consists of a plate-like member which completely covers the adjacent end of the guideway 37 and member 36.

A hole 91 can be formed in the base portion 87 to receive the inner end of the shaft 20 snuggly. The inner end of the shaft 20 extends completely into this hole 91 but does not extend beyond this hole into the guideway 37. The inner end of the shaft can be welded to member 36. The connecting member 86 helps to strengthen the joint between the channel-type member 36 and the shaft 20. The diameter of the hole in member 86 corresponds to the diameter of hole 91 and the two holes are in line of course to form a straight passageway. Triangular-shaped bracket members 92 can be employed to strengthen the connection between connecting member 86 and member 36. The bracket members 92 shown in the drawings are located above and below connecting member 86 and on each side thereof. The bottom bracket member 92 is somewhat larger than the other bracket members in order to enable it to withstand the additional loads thereon. The ring-shaped connecting member 86 may also be rigidly connected to the adjacent shaft 20 and is located very close to the inner end of the sleeve 22.

The second part 21 of each workholding element 18 includes a sliding block 38 and a connecting or mounting flange 40 which is rigidly connected to the sliding block 38. As seen in FIG. 5, block 38 has a vertical cross section corresponding to that of guideway 37 and has cross-sectional dimensions just slightly less than that of the guideway to permit the block to slide freely in the guideway. The end plates 39 of course prevent the block 38 from sliding out of the guideway at the ends thereof. Because the portion of the block 38 closest to the base portion 87 of member 36 has a width greater than the width of guideway 37 between the two lips 89, the block 38 is prevented from being pulled inwardly out of member 36. The length of the block 38 in the longitudinal direction of guideway 37 could typically be 12 inches for one embodiment wherein the length of the guideway is 30 inches so as to permit a travel distance of the block in the guideway of approximately 18 inches.

The connecting flange 40 is rigidly connected to block 38 near one end of the inside surface of the block. The block could for example be welded to the flange 40. The connection between flange 40 and block 38 is strengthened by means of three triangular-shaped bracket members 93. Each of these members 93 is welded along one side to the rearward facing surface of flange 40 and is welded along another side to the inner surface of block 38. In the illustrated embodiment of the flange, the inner edge of the flange is arc-shaped while the edge adjacent the sliding block 38 is straight. The arc shape of the inner edge is to accommodate the circular frame of the workpiece to which this edge is rigidly connected by means of bolts extending through the holes 94 distributed along this edge.

In the illustrated preferred embodiment of the workholder, a motor 24, such as a hydraulic motor, is used to rotate the workholding means (and thus the workpiece) as desired. Although the illustrated motor is hydraulic, it will of course be understood that some other form of motor could be used which would be within the scope of the present invention such as an electrical or pneumatic motor. The hydraulic motor 24 shown is rigidly connected to the outer side of support plate 78 at the right hand side of the workholder shown in FIGS. 1 and 2. A short drive shaft 25 extends through support plate 78 a short distance and is connected to a relatively small toothed sprocket 28. The sprocket 28 is operatively connected to a larger sprocket 30 by means of a drive chain 29. The sprocket 30 is rigidly connected to a long connecting shaft 26 which extends almost the entire width of the workholder. The shaft 26 is rotatable mounted in the two support plates 78 and each end of the shaft projects a short distance outwardly from the adjacent plate 78. If desired, suitable bearings may be arranged between each end of the shaft 26 and the support plate 78. The right hand end of shaft 26 as seen in FIG. 2 is rigidly connected outside the support plate 78 to a small sprocket 32. Similarly a further small sprocket 32 is rigidly connected to the left hand end of the connecting shaft 26. By means of rotation of the shaft 26, each sprocket 32 drives a drive chain 33 which in turn drives a large-toothed sprocket 34. Each sprocket 34 is rigidly connected to the outer end of one of the turn-over shafts 20. Each sprocket 34 can be keyed in a known manner to the shaft and additional support for the sprocket can be provided in the form of an inner circular flange 35. This flange 35 has a diameter approximately half that of the sprocket 34 and is located immediately adjacent the inner surface of the sprocket 34. The flange 35 is rigidly connected to the shaft 20 so that it rotates with the shaft and the sprocket. Thus it will be readily seen that operation of the hydraulic motor 24, which is capable of rotating its drive shaft 25 either clockwise or counterclockwise, will cause both of the turn-over shafts 20 to rotate together at the same time. This in turn will rotate the workpiece mounted on the workholding means 13.

As stated earlier, the workholder 11 of the present invention includes a control system which includes a sensing means (described hereinafter) that is sensitive to out of balance forces within the workholder caused by rotation of the workpiece 14 when held by the workholding means 13 and by horizontal movement of the centre of gravity of the workpiece relative to the axis of rotation 15. This sensing means provides an output signal indicative of these forces. The aforementioned adjusting means 23 is responsive to this output signal to effect positional adjustment of the workholding means on the structure 10 relative to the axis of rotation 15, this positional adjustment tending to decrease and remove the out of balance forces. The adjusting means will now be described in greater detail with particular reference to FIGS. 4 and 5 of the drawings. The adjusting means 23 includes a motor 42 and a lead screw 44 driven by the motor 42. Although the motor 42 of the illustrated embodiment is a hydraulic motor, it will be readily understood by those skilled in the art that the motor could also comprise other types of motors such as an electric or pneumatic motor. The motor 42 is connected to one of the end plates 39 at the side thereof furthest from the adjacent sprocket 34. The lead screw 44 extends the entire length of the guideway 37 and through each of the end plates. The portion of the lead screw in the guideway is threaded and this portion extends through a correspondingly threaded hole in the sliding block 38. The unthreaded portion at each end of the lead screw which extends through the end plate 39 has a slightly reduced diameter compared to the threaded portion of the lead screw. The shoulder thus formed at each end bears against a washer 95. The motor 42 is capable of rotating the lead screw either clockwise or counterclockwise and it will be readily seen that such rotation of the lead screw will cause the sliding block 38 to move either towards the motor 42 or away therefrom depending on the direction of rotation of the lead screw. Thus, adjusting means are provided for adjusting the position of the workholding means 13 relative to the axis of rotation 15. It will also be understood that the two motors 42 operate together and at the same time so that each connecting flange 40 is the same distance from the axis of rotation as the other flange 40 at all times.

When the workpiece 14 is placed on the workholding means 13 it is placed thereon in such a manner that the center of gravity of the workpiece is located in the plane defined by the two center lines 96 of the two workholding elements. In the illustrated embodiment of the workholder, this center line can be taken as corresponding the center axis of the lead screw 44 of each workholding element 18. It will thus be seen that it is possible for the adjusting means 23 including the two lead screws 44 to move the center of gravity of the workpiece closer to the axis of rotation 15. Indeed, providing the amount of travel of the sliding blocks 38 is sufficient, the adjusting means can bring the center of gravity into alignment with the axis of rotation 15. Indeed, the workholder of the present invention can be designed in a known manner to automatically locate the center of gravity of the workpiece in this plane defined by the center lines of the two workholding elements 18. This therefore eliminates the need for an additional adjusting means which operates at right angles to adjusting means 23 to center the center of gravity in the plane defined by the two center lines of the elements 18. This known means for locating the center of gravity on the plane of the center lines is not shown in the illustrated workholder for the sake of simplicity. It will also be noted that such means are not necessarily required with many workpieces since in many cases it is easy to determine the plane in which the center of gravity must be located (i.e. because of the symetrical nature of the workpiece). It is then easy to simply align this plane with the plane defined by the center lines of the workholding elements 18 with the eye as the workpiece is attached to the workholding means.

For reasons which will become obvious hereinafter, the workholder of the present invention is preferably provided with an attitude sensing device 65 which is mounted on at least one of the workholding elements 18 of the workholding means 13 and which adapted to sense the attitude of the workholding elements relative to the horizontal plane. The attitude sensing device 65 has two sensing parts 64 and 68, the ends of which can be seen in FIG. 4 of the drawings. Each sensing part preferably comprises a single-pole, double throw mercury tilt switch mounted with its longitudinal axis perpendicular to the aforementioned center line of the workholding elements 18. It will be noted that these center lines extend in a vertical direction when the workholding elements are in a generally upright position, as opposed to the horizontal position shown in the drawings. The manner of operation of each of these mercury tilt switches can best be seen from examination of FIG. 6 of the drawings wherein the two tilt switches are shown arranged end to end. This of course is a possible alternative arrangement to that shown in FIG. 4 where the two switches are located along side each other. Generally speaking, each of these mercury tilt switches consists of an elongated glass bubble having a small pool of mercury therein. An electrical input wire is connected to each end of this glass bubble and an electrical output wire is also connected to each end. By tilting the longitudinal axis so that it is at an angle to the horizontal, the mercury is brought to one end of the bubble and connects the input and output wires at this end. When the bubble is tilted in the other direction, the pool of mercury runs down to the other end of the bubble and connects the input and output wires at this other end. It will be readily seen that the particular input and output wires which are connected at any one time will depend on the tilt of the workholding elements. Obviously, there are many alternative devices which could be substituted for the mercury tilt switches described and the use of such alternatives would of course fall within the broad scope of the present invention.

Figure 6:
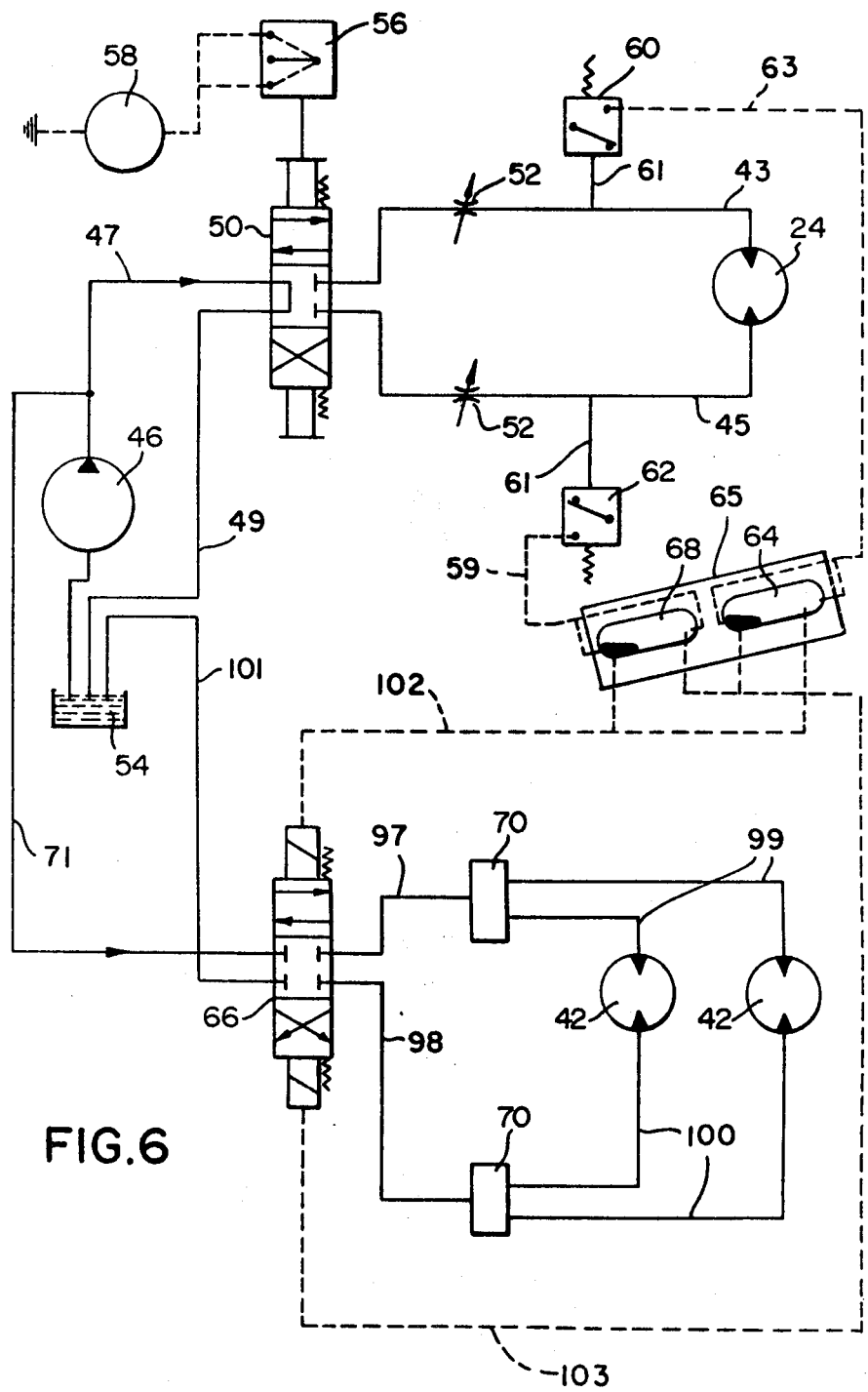
FIG. 6 shows a preferred form of control system for the workholder of the invention.

Reference will now be made to FIG. 6 of the drawings wherein there is shown a preferred form of the control system of the present workholder. Although the control system will be described hereinafter in terms of a hydraulic control system and although FIG. 6 is particularly directed to such a system, it will be clearly understood that in place of such a system an electrical or a pneumatic system could equally well be employed. The various components of the control system, except for those already described, are shown only schematically in FIG. 6 because the construction of each individual part is well known to those skilled in hydraulic and fluid systems and is therefore deemed not to require further explanation herein.

The hydraulic motor 24 already described, is operated by hydraulic fluid entering and leaving the motor by two hydraulic fluid lines 43 and 45. The fluid entering and leaving these lines is controlled by a four-way, three position, main hydraulic valve 50. The valve 50 is preferably a tandem-center valve which is actuated manually by the operator of the workholder. The three positions of the valve 50 include a first position wherein the motor 24 rotates in a clockwise direction, a second position wherein the motor 25 rotates in a counterclockwise direction, and a third position in which the motor does not rotate at all but remains stationery. Whether the valve is in one of these three positions depends on the position of the spool of the valve 50. The valve 50 is connected to a feeding hydraulic pump 46 by means of hydraulic line 47. Also the valve 50 is connected to a hydraulic fluid reservoir 54 by means of hydraulic line 49. Valve 50 is thus a four-way valve since four hydraulic lines are connected to the valve as described.

In a known manner, the workholder of the present invention is preferrably provided with brake means 58 for selectively preventing rotation of the workholding means 13 and the workpiece relative to the primary structure 10 when desired. The rotating element of the brake means 58 (which is not shown in the drawings) is fixed to and rotates with one or both of the workholding elements 18. Since such brake means are well known in the industry and are not of a novel construction, the brake means have been omitted from the drawings and are not described in detail herein for the sake of brevity and simplicity.

A control switch 56, also of known construction, operates the brake means 58 automatically due to the fact that the switch 56 is actuated mechanically by the hydraulic valve 50. Thus whenever the valve 50 is moved to either one of the two positions in which the motor 24 is actuated, the control switch 56 is automatically moved to a position wherein the brake means 50 is released. This of course permits the workholding means 13 to be rotated by the motor. When the spool of valve 50 is moved to the stop or third position, usually the center position, in which the motor 24 is stopped, the switch 56 is automatically moved to the position that actuates the brake means. Thereupon the brake means positively resist any further rotation of the workholding means and workpiece.

Mounted in each of the hydraulic fluid lines 43 and 45 is a flow control valve 52. These valves resist to a predetermined extent hydraulic fluid flow in the lines 43 and 45 and, by doing so, control any runaway condition which might tend to occur when the center of gravity of the workpiece is displaced horizontally away from the axis of rotation 15 and when the workpiece is being rotated by the motor 24 in the direction that the torque caused by the weight of the workpiece is directed. In this situation, the motor 24 tends to overspeed and this could result in damage to the motor. The valves 52 prevent the possibility of this occurring since the fluid can only pass through these valves at a certain rate.

As stated above, the workholder includes sensing means which are sensitive to out of balance forces with the workholder caused by rotation of the workpiece when held by the workholding means 13 and horizontal movement of the center of gravity of the workpiece relative to the axis of rotation. In the illustrated embodiment, this sensing means comprises two pressure senstive switches 60 and 62, each of which is either mounted in one of the lines 43 and 45 or connected to one of these lines by means of a short connecting line 61. Thus the switch 60 is able to sense the hydraulic pressure in hydraulic fluid line 43 and whenever the pressure in this line exceeds a predetermined level, this switch sends a certain output signal through the electrical wire 63. Similarly, the switch 62 senses the hydraulic pressure in hydraulic fluid line 45 and whenever the pressure in this line exceeds the same predetermined level or value, the switch 62 emits a certain output signal through electrical wire 59. As can be seen from FIG. 6, wire 63 is connected to both ends of the tilt switch 64 while wire 59 is connected to both ends of the tilt switch 68. It will be understood of course that only one of the switches 60 and 62 will be activated at any single point in time during the operation of the motor 24. Which switch operates will of course depend on whether the motor 24 is operating in the clockwise direction or in the counterclockwise direction and on whether the torque resulting from the weight of the workpiece is resisting the direction of rotation of the motor or is causing the motor to overspeed.

The adjusting means 23 of the present invention, as well as including the aforementioned motors 42 and attitude sensing device 65, includes a three-position valve 66 and two hydraulic manifolds 70 connected thereto. The valve 66 is preferably a four-way, double acting, blocked-center, spring returned valve which is operated by two solenoids. It is actuated by output signals transmitted through the attitude sensing device 65. The three positions of the valve 66 comprise a first position which causes the motors 42 to adjust the position of the workholding means 13 in one direction, a second position which hydraulically locks the motors 42 so that the workholding means and workpiece remain stationery, and a third position which causes the motor means or motors 42 to adjust the position of the workholding means in a direction opposite to that of the first position. Hydraulic fluid is supplied to the valve 66 via hydraulic fluid line 71 from the pump 46. When the valve 66 is either in the aforementioned first or third positions, this hydraulic fluid under pressure is fed either through line 97 or line 98 (depending on whether the valve is in the first or third position). Oil fed through line 97 will then be fed to the two hydraulic fluid lines 99 via one of the manifolds 70. Each of the lines 99 feeds one of the two motors 42 for adjusting one of the workholding elements. The hydraulic fluid then flows back to valve 66 from each motor via a hydraulic fluid line 100 and the other manifold 70. The used hydraulic fluid drains back to the reservoir 54 from valve 66 by means of a hydraulic fluid line 101. Alternatively, if the motors 42 are to operate in the opposite direction and the valve 66 is in the correct position, hydraulic fluid from line 71 is fed through line 98, the two lines 100 and finally through the motors 42. It then returns via lines 99, 97, valve 66 and line 101 to the reservoir 54. When no output signal is being transmitted from either of the pressure sensitive switches 60 and 62, spring return system of the solenoid operative valve 66 moves this valve to the second or middle position, thus locking the two motors 42 so that they do not operate. Thus the workpiece is safely locked in the desired position relative to the axis of rotation 15.

As can be seen from FIG. 6, the left hand end of the tilt switch 68 is electrically connected to an electrical wire 102 whereas the opposite end of tilt switch or sensing part 64 (i.e. the right hand end in FIG. 6) is electrically connected to the same wire 102. In a similar manner, the right hand end of sensing part or tilt switch 68 is electrically connected to a wire 103 whereas the left hand end of sensing part 64 is connected to this wire 103. As stated earlier, only one of these two sensing parts will be receiving an output signal at any one point in time since only one of the two pressure sensitive devices 60 and 62 will operate at any one point in time. Thus if pressure sensitive switch 60 is emmitting an output signal, only the sensing part 64 will effectively be in operation. Depending on the tilt of this sensing part 64, the output signal will either be transmitted through wire 102 or will be transmitted through wire 103.

The wire 102 could, for example, be connected to the solenoid so that whenever an output signal is transmitted through it the solenoid moves the valve to the first position thereof. In such a case, the wire 103 would be connected to the solenoid so that the solenoid operates to move the valve to the third position thereof. Thus an output signal from pressure sensitive switch 60 will cause the valve to operate in the first position if the tilt switch or sensing part 64 shown in FIG. 6 is tilted to the right whereas the output signal from the switch 60 will cause the valve 66 to operate in the third position if it is tilted to the left (as shown). The opposite would be true in the case of an output signal from pressure sensitive switch 62 passing through sensing part 68.

Turning now to FIGS. 7 and 8 of the drawings wherein the manner of operation of the workholder is explained with the use of schematic representations thereof and the workpiece is represented by the large rectangular block 14 in each sketch. The supporting structure is indicated at 10 while the workholding means is indicated at 13. The direction of rotation of the workpiece is indicated by the large solid arrow 104 in each sketch. It will be seen from examination of the sketches of FIG. 7 that the workpiece in each of these sketches is being rotated in a clockwise direction. Similarly, the workpiece in each of the sketches A to D of FIG. 8 is being rotated in a counterclockwise direction. It is obvious in each of these sketches that the center of gravity of the workpiece 14 is displaced horizontally away from the axis of rotation 15 of the workholder. It is thus desirable to adjust the position of the workpiece so that the center of gravity thereof is moved closer to the axis of rotation. The desired direction of movement of the workpiece in each case is indicated by the small straight arrow 105. The motor means or motor 42 on each of the workholding elements 18 is indicated by the square 42 in each of the sketches.

Finally the lead screw from each of the motors 42 is represented by the circle 44 and the desired direction of rotation of the lead screw is indicated by the small curved arrow 106. If rotation of the lead screw 44 will definitely occur, the arrow is shown in solid lines. This will normally be the case where the torque created by the center of the workpiece is making it more difficult for the motor 24 to rotate the workpiece. If there is a possibility that no rotation of the lead screw 44 will occur or is necessary the arrow 106 is shown in dotted lines.

Figure 8A:
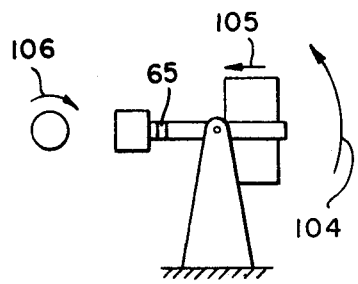
Figure 8B:
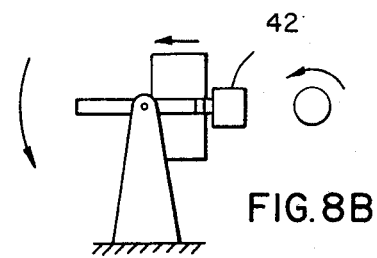

It will be seen from an examination of sketches 7C, 7D, 8A, and 8B that clockwise rotation of the workpiece will cause a general lifting thereof when the center of gravity of the workpiece lies to the left of the center of rotation and counterclockwise rotation of the workpiece will cause the same general lifting of the workpiece when the center of gravity thereof lies to the right of the center of rotation. Since the center of gravity of the workpiece is offset horizontally with respect to the axis of rotation 15, a moment or torque is applied to the workholding means by the workpiece and this torque or moment is in the opposite direction to that in which it is desired to rotate the workpiece. The useful torque necessary therefore to rotate the workholding means 13 and the workpiece is therefore greater than it would be if the center of gravity of the workpiece were located on the axis of rotation 15. Because this greater torque is required, the input pressure in one of lines 43 and 45 to motor 24 increases to a point exceeding the predetermined pressure level which actuates switches 60 and 62. Suppose for example that the input line of motor 24 is hydraulic line 43 when the motor must rotate the workpiece in the clockwise direction. In the case of FIGS. 7C and 7D then, the pressure sensitive switch 60 will be activated when the pressure in line 43 exceeds the predetermined level. In the case of FIGS. 8A and 8B where the workpiece is to be rotated counterclockwise, the input line would then be line 45 and pressure sensitive switch 62 would be activated when the pressure in line 45 exceeded the predetermined level.

Turning now specifically to the situation shown in FIG. 7C, the output signal from switch 60 will be transmitted to the sensing part 64 of the sensing device 65 indicated in each of the sketches. The sensing part 64 is tilted to the left in this Figure (i.e. towards the bottom of the device 65 indicted in the sketch). Therefore the output signal is transmitted through wire 103 to the solenoid of valve 66 which causes the valve 66 to move to the third position. This position of the valve 66 in turn causes the lead screw to be rotated counterclockwise which in turn causes the workpiece to be moved away from the end of the workholding element having the motor 42 towards the axis of rotation 15. When the center of gravity of the workpiece has been moved by the lead screw 44 until it is more or less in line with the axis of rotation 15, the pressure required to operate the motor 24 will return to a level below the predetermined level for actuating pressure sensitive switch 60. When this occurs the transmission of the output signal from switch 60 will cease and this will automatically return the position of valve 66 to its second position in which the motors 42 become locked and cease to operate.

Turning now to the case of FIG. 7D, the sensing part 64 will be tilted to the right in this figure so that the output signal from switch 60 is transmitted through wire 102. This causes the solenoid to move the valve 66 to the first position. In this position, the lead screw 44 rotates in the clockwise direction so as to move the workpiece closer to the end of the workholding element on which the motor 42 is mounted (and also of course closer to the axis of rotation 15).

In the case of FIG. 8A, the switch 62 will transmit an output signal to sensing part or tilt switch 68 which will be tilted to the left. Thus the output signal will be transmitted to wire 102. This in turn causes the lead screw of course to be rotated in the clockwise direction so that the workpiece is moved towards the axis of rotation 15.

In the case of FIG. 8B, the output signal from switch 62 is sent via sensing part 68 through wire 103 so that the lead screw rotates in the counterclockwise direction and thus moves the workpiece closer to the axis of rotation 15.

Figure 7A:
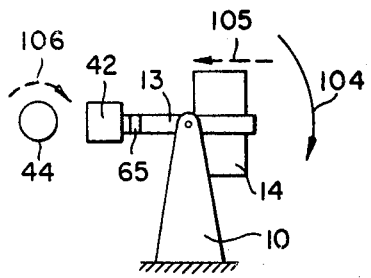
FIGS. 7A to 7D and 8A to 8D are schematic representations of the workholder illustrating the manner of operation of the invention.
Figure 7B:
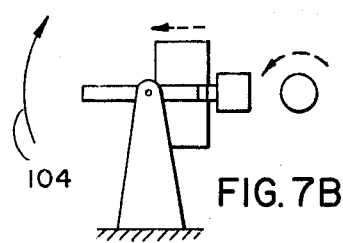
Figure 7C:
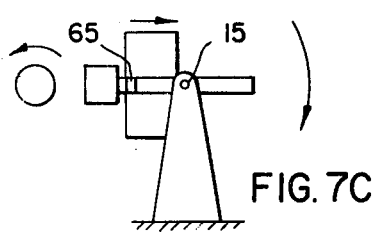
Figure 8C:
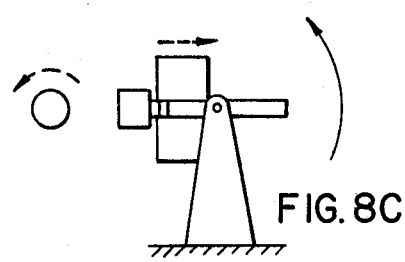
Figure 7D:
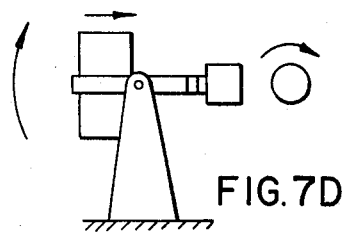
Figure 8D:
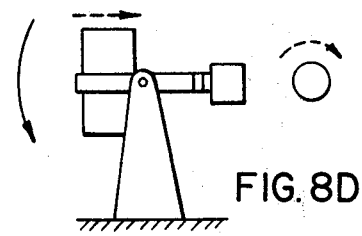

As can be seen from an examination of FIGS. 7A and 7B, the weight of the workpiece when the center of gravity thereof is located horizontally to the right of the axis of rotation 15 creates a moment or torque in the same direction as the desired direction of rotation of the workpiece, that is in the clockwise direction. Similarly, FIGS. 8c and 8d illustrate that the weight of the workpiece when the center of gravity thereof is located horizontally to the left of the axis of rotation will create a moment in the same direction as the desired direction of rotation, that is, in the counterclockwise direction. In any of the four situations illustrated in these four sketches, little or no power will be required to rotate the workholding means 13 and the attached workpiece 14. As explained, in this situation motor 24 may tend to overspeed and act as a pump due to the fact that it is being forced to turn by the rotation of the workholding means. Restriction of the flow of hydraulic fluid in one of lines 43 and 45 (whichever is the output line from the motor 24) by one of the valves 52 will cause a backpressure in this output line from the motor. This backpressure can cause one of two things to happen. Firstly, the backpressure could have no effect at all where the center of gravity of the workpiece is not displaced horizontally from the axis of rotation 15 sufficiently to cause the backpressure to rise to the predetermined level which activates either one of the pressure sensitive switches 60 and 62. The workholding means and workpiece in this case will simply continue to rotate with the aid of the motor 24. As stated earlier, any overspeed that might occur is limited by the flow control valves 52 which are adjustable and which restrict the rate of flow of hydraulic fluid through lines 43 and 45.

The other possibility is that the backpressure in either line 43 or line 45 could rise to a level which exceeds the predetermined level of pressure that activates either switch 60 or switch 62. For example, assuming that hydraulic line 45 is the output line of the motor 24 for clockwise rotation of the workpiece, the pressure sensitive switch 62 will be activated once the pressure exceeds the predetermined level. In the situation illustrated then in FIG. 7A, the tilt switch or sensing part 68 is tilted to the left so that the output signal from switch 62 is transmitted through wire 102. This output signal causes the solenoid to move valve 66 to the first position so that the lead screw 44 is turned in a clockwise direction. This in turn moves the workpiece closer to the end of the workholding element on which the motor 42 is mounted and thus closer to the axis of rotation 15.

However, in the situation illustrated in sketch 7B, the output signal from switch 62 will be sent through wire 103 by the sensing part 68. This in turn will cause the lead screw to rotate in the counterclockwise direction which moves the workpiece away from the motor end of the workholding element towards the axis of rotation 15 again.

In the counterclockwise cases illustrated in sketches 8C and 8D, the line 43 will be the output line and pressure sensitive switch 60 will be activated when the pressure in the line 43 exceeds the predetermined level. In the FIG. 8C situation, the output signal is transmitted through the left hand side of tilt switch 64 (since this switch is tilted to the left) through the wire 103. As explained already, an output signal through wire 103 moves the valve to the third position which causes counterclockwise rotation of the lead screw. Thus the workpiece is moved towards the axis of rotation 15 again.

In the FIG. 8d situation, the output signal from switch 60 is sent through wire 102 by the tilt switch 64 so that the valve 66 is moved to the first position. This causes clockwise rotation of the lead screw 44 and causes the workpiece to be moved again towards the axis of rotation. In each of these four cases, when the center of gravity of the workpiece is more or less coincident with the axis of rotation 15, the centering action by the workholding elements and motors 42 will stop due to the fact that no output signal will be transmitted by either of the switches 60 or 62, causing valve 66 to be moved to the second position.

When the center line of the workholding means, that is the center line generally corresponding to the center axis of the lead screws 44, passes through a vertical position, the setting of the valve 66 is automatically brought to the center or second position in which rotation of the motors 42 ceases and the motion of the center of gravity of the workpiece relative to the axis of rotation 15 also ceases. The switches 64 and 68 can carry out this step by well known gravity or other means.

The following chart sets out the various components illustrated in the sketches of FIGS. 7 and 8 as explained above. For each sketch shown in the drawings, the desired direction of the components of the workholder and workpiece are set out as well as the position of the motor end of the workholding elements and switches 60 and 62.

FUNCTION CHART

| FIG. | Rotation Of Fixture | Position Of C.G. | Position Of Motor End Of Fixture | Overrun Condition | Switch 60 | Switch 62 | Tilt Switch In Circuit | Rotation Of Centering Motors 42 | Movement Of Centering Fixture (Always Towards Pivot) |
|---|---|---|---|---|---|---|---|---|---|
| 7(a) | Clockwise | Right Of Center | Left Of Center | Yes | Open | Open or Closed | 68 | None or C.W. | To left |
| 7(b) | Clockwise | Right Of Center | Right Of Center | Yes | Open | Open or CLosed | 68 | None or C.C.W. | To left |
| 7(c) | Clockwise | Left Of Center | Left Of Center | No | Closed | Open | 64 | C.C.W. | To right |
| 7(d) | Clockwise | Left Of Center | Right Of Center | No | Closed | Open | 64 | C.W. | To right |
| 8(a) | Counter-clockwise | Right Of Center | Left Of Center | No | Open | Closed | 68 | C.W. | To left |
| 8(b) | Counter-clockwise | Right Of Center | Right Of Center | No | Open | Closed | 68 | C.C.W. | To left |
| 8(c) | Counter-clockwise | Left Of Center | Left Of Center | Yes | Open or Closed | Open | 64 | None or C.C.W. | To right |
| 8(d) | Counter-clockwise | Left Of Center | Right Of Center | Yes | Open or Closed | Open | 64 | None or C.W. | To right |

What I claim as my invention is:

1. A workholder comprising a primary supporting structure; workholding means mounted for rotation in said structure about a fixed axis of rotation; a control system comprising sensing means sensitive to out of balance forces within said workholder, said forces being caused by the rotation of a workpiece when held by said workholding means and horizontal movement of the center of gravity of said workpiece relative to said axis of rotation, said sensing means providing an output signal indicative of said forces, and adjusting means responsive to said output signal to effect positional adjustment of said workholding means on said structure relative to said axis of rotation, said positional adjustment tending to decrease and remove said out of balance forces.

2. A workholder according to claim 1 wherein said workholding means comprises a pair of workholding elements providing a work-receiving area therebetween, each element comprising a first part mounted for rotation on a shaft journaled in said structure and a second part attachable to said workpiece, rotatable with said first part, and slidable in said first part, sliding movement of said second part within the first part being controlled by said adjusting means responsive to said output signal.

3. A workholder according to claim 2 wherein each second part is attachable to a circular frame formed integrally on and surrounding said workpiece, said circular frame being located adjacent the side of each first part which is opposite the respective shaft of the first part when said circular frame is attached.

4. A workholder according to claim 1 wherein said adjusting means includes hydraulic motor means and hydraulic fluid valve means and said sensing means includes pressure sensitive switching means which actuate when hydraulic pressure in a portion of said control system exceeds a predetermined level.

5. A workholder according to claim 4 wherein said pressure sensitive switching means includes two pressure sensitive switches, said workholder includes a hydraulic motor to rotate said workholding means, and operated by hydraulic fluid entering and leaving said motor by two hydraulic fluid lines, one of said switches sensing the pressure in one of said fluid lines and the other of said switches sensing the pressure in the other of said fluid lines.

6. A workholder according to claim 5 wherein said adjusting means includes an attitude sensing device, said device being mounted on said workholding means and adapted to sense the attitude of said workholding means and to transmit the output signal accordingly to the remainder of said adjusting means.

7. A workholder according to claim 6 wherein said attitude sensing means has two sensing parts, one of said sensing parts being connected in series to said one of said switches and to said hydraulic fluid valve means and the other of said sensing parts being connected in series to said other of said switches and to said hydraulic fluid valve means.

8. A workholder according to claim 7 wherein each sensing part of said attitude sensing means is a single-pole, double throw mercury tilt switch mounted with its longitudinal axis perpendicular to a center line of the workholding means, said center line passing generally through said axis of rotation and being parallel to the direction of said sliding movement of said second part.

9. A workholder according to claim 1 wherein said adjusting means includes an attitude sensing device, said device being mounted on said workholding means and adapted to sense the attitude of said workholding means and to transmit the output signal accordingly to the remainder of said adjusting means.

10. A workholder according to claim 1 wherein said adjusting means includes an attitude sensing device, said device being mounted on said workholding means and adapted to sense the attitude of said workholding means and to transmit the output signal to the remainder of said adjusting means according to said attitude, said remainder including motor means to move at least a portion of said workholding means to effect said positional adjustment in response to said output signal.

11. A workholder according to claim 10 wherein said adjusting means includes a three position hydraulic valve, said motor means is hydraulic and is operated by said three position hydraulic valve, and said hydraulic valve is connected to said attitude sensing device to receive and to be actuated by said output signal therefrom according to the attitude of said workholding means.

12. A workholder according to claim 11 wherein said sensing means includes pressure sensitive switching means which actuate when hydraulic pressure in a portion of said control system exceeds a predetermined level.

13. A workholder according to claim 12 wherein said pressure sensitive switching means includes two pressure sensitive switches, said workholder includes a hydraulic motor to rotate said workholding means and operated by hydraulic fluid entering and leaving said motor by two hydraulic fluid lines, one of said switches sensing the pressure in one of said fluid lines and the other of said switches sensing the pressure in the other of said fluid lines.

14. A workholder according to claim 13 wherein said attitude sensing means has two sensing parts, one of said sensing parts being connected in series to said one of said switches and to said hydraulic valve, the other of said sensing parts being connected in series to said other of said switches and to said hydraulic valve.

15. A workholder according to claim 14 wherein each sensing part of said attitude sensing means is a single-pole, double throw mercury tilt switch mounted with its longitudinal axis perpendicular to a centre line of the workholding means, said centre line passing generally through said axis of rotation.

16. A workholder according to claim 15 wherein the first position of said three position hydraulic valve causes said motor means to adjust the position of said workholding means in one direction, the second position thereof hydraulically locks said motor means and the third position thereof causes said motor means to adjust the position of said workholding means in a direction opposite to said one direction, and wherein each end of each tilt switch is connected to a solenoid which moves said hydraulic valve to one of said first and third positions whereby when each tilt switch is tilted downwards towards one end of the tilt switch said hydraulic valve is moved to said first position and, when each tilt switch is tilted downwards towards the end opposite said one end, said hydraulic valve is moved to said third position.

17. A workholder according to claim 16 wherein said workholding means comprises a pair of workholding elements providing a work-receiving area therebetween, each element comprising a first part mounted for rotation on a shaft journaled in said structure and a second part attachable to said workpiece, rotatable with said first part, and slidable in said first part, sliding movement of said second part within the first part being controlled by said adjusting means responsive to said output signal.

18. A workholder according to claim 17 whrein said motor means includes two hydraulic motors each mounted to one of said first parts and adapted to slide the respective second part in said one first part.

19. A workholder according to claim 6 wherein said hydraulic motor is operated by a three position main hydraulic valve connected to said hydraulic motor via said two fluid lines, a safety valve is interposed along each fluid line to prevent overspeed of said hydraulic motor, and the pressure sensitive switch in each line is interposed between the hydraulic motor and the safety valve of the respective line.

20. A workholder according to claim 2 including brake means for selectively preventing rotation of said workholding means and said workpiece relative to said structure when desired.

* * * * *